Feb. 4, 1958 T. O. BRANDON 2,822,174
MATCHED GOLF CLUBS
Filed Aug. 10, 1954 2 Sheets-Sheet 1

INVENTOR
Thomas O. Brandon
BY Johnson and Kline
ATTORNEYS

Feb. 4, 1958  T. O. BRANDON  2,822,174
MATCHED GOLF CLUBS
Filed Aug. 10, 1954  2 Sheets-Sheet 2

INVENTOR
Thomas O. Brandon

BY Johnson and Kline
ATTORNEYS

United States Patent Office 2,822,174
Patented Feb. 4, 1958

2,822,174

MATCHED GOLF CLUBS

Thomas O. Brandon, Cucamonga, Calif., assignor to A. G. Spalding & Bros., Inc., Chicopee, Mass., a corporation of Delaware Application August 10, 1954, Serial No. 448,970

1 Claim. (Cl. 273—80)

This invention relates to correlated and coordinated shafts for matched sets of golf clubs.

Heretofore, in the formation of matched sets of golf clubs, care has been taken to provide for predetermined relationships between the various clubs as a whole for the woods and the irons but no one, so far as I am aware, has ever coordinated the shafts to be used in a matched set so as to provide a predetermined relationship uniformly throughout the shafts for the woods and irons.

The present invention overcomes these deficiencies in the prior practice by providing matched sets of shafts and the method of producing the same wherein their three essential factors, namely, length of the shaft, weight of the shaft, and shaft stiffness are correlated in a predetermined manner throughout the woods and irons.

This is accomplished by forming shafts of each length required for the set with a predetermined stiffness characteristic in which the weight and stiffness have a predetermined straight line relation, and the shafts of the set are further correlated by having a predetermined relationship between the length and stiffness of the shaft for a given weight and stiffness characteristic of shaft. Clubs having shafts so matched will provide uniformity of feel and play.

In determining the stiffness characteristics of the shafts, the stiffest shafts and the softest shafts produced by the design of the shaft have their weight and stiffness plotted in parallel straight lines and the intermediate categories are disposed on parallel lines lying therebetween, preferably in overlapped relation so as to eliminate any gaps in stiffness classification.

Other features and advantages of the invention will be apparent from the specification and claim when considered in connection with the drawings in which:

In providing shafts for matched golf clubs, there are three essential factors that must be correlated, namely, length of the shaft, weight of the shaft and shaft stiffness.

I have discovered that the stiffness characteristics of shafts of a given length should have straight line relationships between weight and stiffness for each of the types of shafts desired, i. e., men's or women's iron and wood clubs.

The shafts used to illustrate the present invention are tubular metal tapered shafts having stepped portions of predetermined pattern. They are provided in the various lengths and with various butt diameters in each length, the larger butt diameters forming the stiffer shafts. By changing the pattern of the stepped portions, and by varying the wall thickness and diameters of the shaft various desired stiffness characteristics can be obtained.

Figure 1:
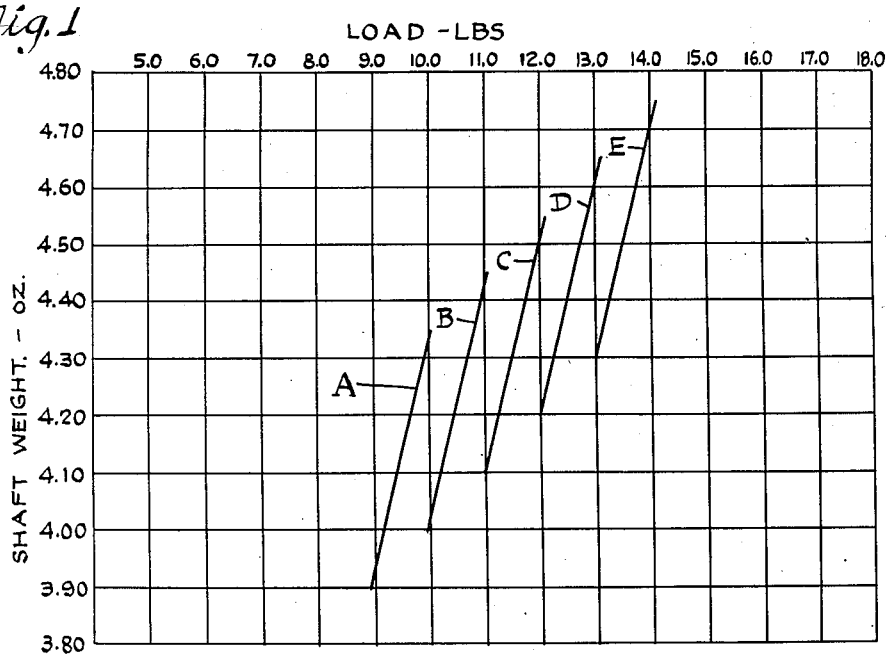
Figure 1 is a weight-stiffness chart for a 44" shaft for woods showing stiffness characteristics categories.

It is at present preferred to set up five categories of stiffness characteristics for each shaft length. For example, in Fig. 1 is shown the weight-stiffness chart for a 44" shaft for a wood club in which a women's medium shaft is indicated by line A, men's soft or women's stiff shaft by line B, men's medium shaft by line C, men's stiff shaft by line D and men's extra stiff shaft by line E. In setting up these categories, it will be noted that lines A and E include the maximum and minimum stiffness, or the stiffest and softest shafts, and that the categories indicated by parallel lines B, C and D are uniformly spaced therebetween, and, in effect, overlap so that there are no gaps and the required stiffness-weight relation can be provided.

Figure 2:
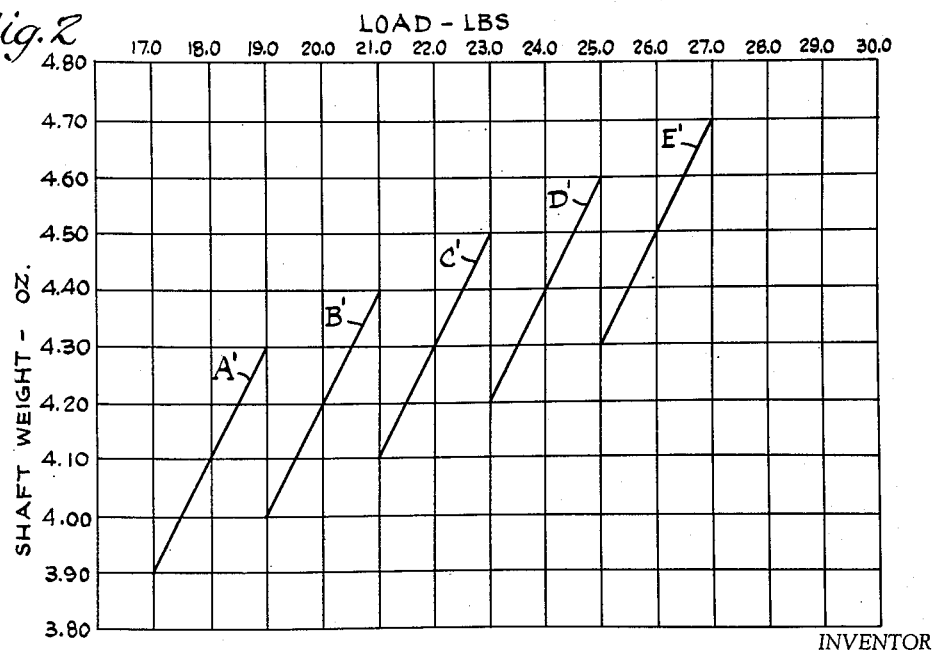
Fig. 2 is a weight-stiffness chart for a 38" shaft for irons showing stiffness characteristics categories.

Similar stiffness characteristics are set up for groups of shafts of other lengths. For example, Fig. 2 shows the weight-stiffness chart for a 38" shaft for an iron in which line A' indicates the women's medium shaft, line B' indicates the women's stiff or men's soft shaft, line C' indicates the men's medium shaft, line D' indicates the men's stiff shaft and line E' indicates the men's extra stiff shaft. The shafts are made so that the shafts of each length will be provided with similar stiffness characteristics.

I have also discovered that in order to provide the same feel and play properties in a matched set of clubs including woods and irons the shafts to be used therein should have a constant weight and stiffness characteristic throughout the set and should be made to have their weight-stiffness correlated in accordance with the formula $$L = aS^n$$

wherein L is the length of the shaft in inches, S is the stiffness in pounds, n is the slope of the plotted line (Fig. 3), a is a constant dependent upon the shaft weight and stiffness characteristic. Theoretically, the formula would have a correction factor added thereto of $\pm c$. However, in practice it has been found that the correction factor is negligible and for practical purposes it will be omitted from the formula.

Figure 3:
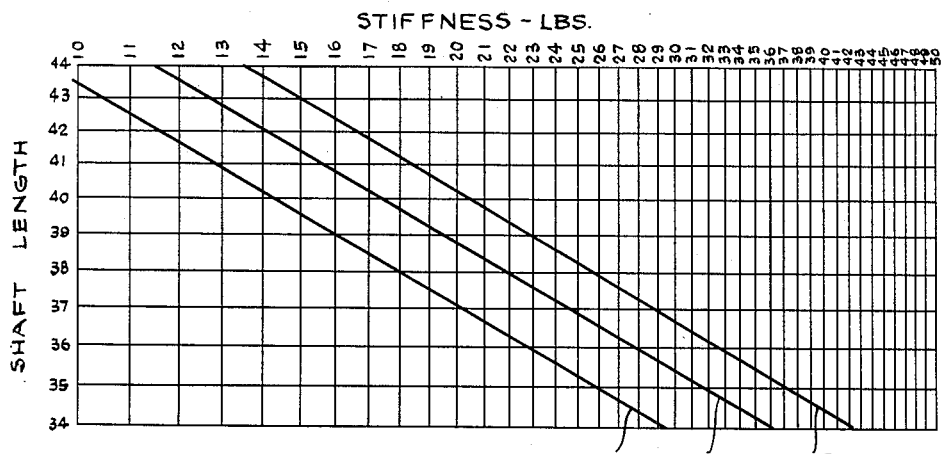
Fig. 3 is a length-stiffness chart for a set of shafts for woods and irons having constant weight and stiffness characteristics.

This probably will be best understood if an illustrated set of shafts is described, for example, the set of shafts each having a weight of 4.3 ounces and a stiffness characteristic of men's medium. Looking at this stiffness characteristic line C on the chart of Fig. 1 for a 44" shaft, it will be found that such a shaft has a stiffness of 11.5 pounds. Looking at the same weight shaft on stiffness characteristic line C' for the 38" shaft on the chart of Fig. 2, it will be found that it has a stiffness of 22 pounds. These points are plotted on a chart on logarithmic paper, as shown in Fig. 3, and a straight line X is drawn therethrough. From this line it can be determined what the proper stiffness for the other length shafts should be. In this connection it will be noted that the 43" and 42" shaft for the woods should have a stiffness of 12.75 pounds and 14.1 pounds respectively. Similarly, in the irons the 37½" shaft should have a stiffness of 23.35 pounds; the 37" shaft should have a stiffness of 24.8 pounds and so on down until the 34" shaft should have a stiffness of 36 pounds. From values noted on this chart the slope n of the plotted line X and the constant a of the formula can be readily determined to be $n = -.225$ and $a = 76.2$ by using the formula for slope $$n = \frac{\text{Log } L - \text{Log } L'}{\text{Log } S - \text{Log } S'}$$

Therefore, for this set of shafts the length and stiffness relation throughout the set will be as follows:

$$L = 76.2 S^{-.225}$$

or $$S = \sqrt[.225]{\frac{76.2}{L}}$$

Similarly, the required line for a set of club shafts of weight 4.5 ounces and men's extra stiff characteristics, line E, would provide a line Y on the chart of Fig. 3 and the required line for a set of shafts having a constant weight of 4.1 ounces and a characteristic of women's medium, line A, would provide the line Z on the chart. It will be noted that all of these lines X, Y, Z, have the same slope and that the only difference is the constant $a$ which defines the position of the line on the chart in accordance with the required weight and stiffness characteristic.

With shafts having different stepped patterns, diameters and wall thickness the weight-stiffness lines setting up the stiffness characteristics of the shafts will vary for the shafts of each length and the values of $n$ and $a$ will change in accordance with the resulting different length-stiffness plotted line for the set resulting from these new weight-stiffness values.

Figure 4:
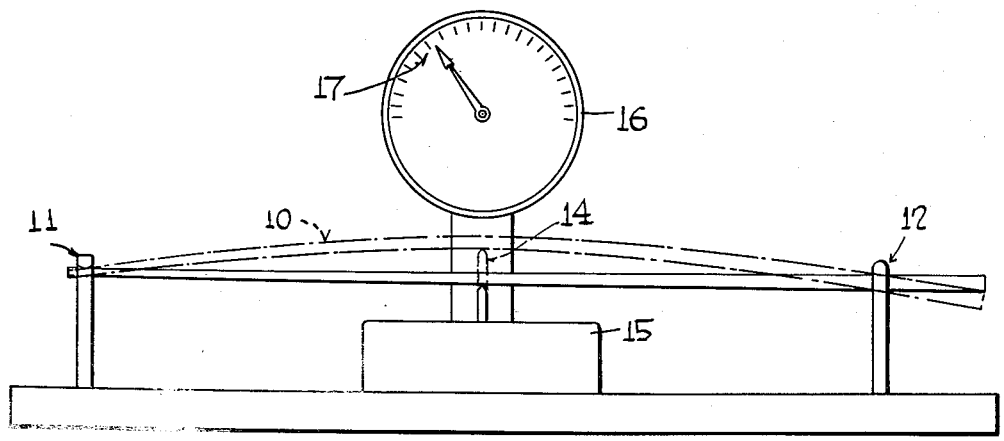
Fig. 4 is a diagrammatic showing of a stiffness testing device.

In producing matched sets, the shafts are checked for length, butt diameter, weight and stiffness and are classified as to stiffness characteristics depending upon which line of the weight-stiffness chart they fall upon. While the stiffness may be checked in many ways, I prefer to measure it by placing the ends of shaft 10 under supports 11, 12 adjustably mounted on the base 13, as shown in Fig. 4, and locating the midpoint of the shaft over an anvil 14 carried by a platform 15 of a scale 16, which anvil is located approximately one inch plus the diameter of the shaft above the center line of the supports so that the shaft is arched between the two supports and over the anvil. The scale connected with the anvil will indicate at 17 the load in pounds necessary to deflect the shaft or otherwise indicate the stiffness of the shaft. Preferably, this is repeated for four 90° rotative positions of the shaft to compensate for any variations in wall thickness and the average of the four is utilized as the stiffness reading for the shaft.

After the shafts have been classified, shafts of the various required lengths having the same weight and stiffness characteristics are assembled into a matched set of shafts whose length-stiffness relationship will conform to the requirements set up by the chart of Fig. 3.

It is to be understood that with shafts of different design similar weight and stiffness relationships can be established to provide stiffness characteristics for each shaft length and uniform sets of shafts having a predetermined length-stiffness relation for the constant weight and stiffness characteristic can be set up to be used with matched sets of golf clubs.

Variations and modifications may be made within the scope of the claim and portions of the improvements may be used without others.

I claim:

In a set of matched golf clubs of the "wood" and "iron" type each having a shaft, a head on one end of the shaft and a grip on the other end of the shaft, the improvement wherein the shafts of the set have the same weight-stiffness characteristic and have a length-stiffness relation throughout the set in accordance with the formula $L=aS^n$ wherein L is the length of the shaft in inches, S is the stiffness of the shaft in pounds, $$n = \frac{\log L - \log L'}{\log S - \log S'}$$

and $a$ is a constant dependent upon the shaft weight and determined by solving formula $L=aS^n$ for known values of L, S and $n$.

References Cited in the file of this patent
UNITED STATES PATENTS 2,250,428    Vickery    July 22, 1941